United States Patent [19]
Galat

[11] Patent Number: 5,940,950
[45] Date of Patent: Aug. 24, 1999

[54] OFFSET GEARED NUTRUNNER ATTACHMENT FOR SEALING WEATHERSTRIPPING ON AN ELONGATED THIN MOLDING

[76] Inventor: Donald E. Galat, 1001 Badder Dr., Fraser, Mich. 48083

[21] Appl. No.: 08/666,956

[22] Filed: Jun. 20, 1996

[51] Int. Cl.[6] .......................... B23P 21/00; B23Q 15/00
[52] U.S. Cl. .......................................... 29/235; 29/243.58
[58] Field of Search ........................... 29/235, 293.58, 29/293.57; 81/57.19

[56] References Cited

U.S. PATENT DOCUMENTS

| | | | |
|---|---|---|---|
| 1,743,977 | 1/1930 | Perkins | 29/243.58 |
| 5,048,170 | 9/1991 | Kuppers | 29/235 |
| 5,460,062 | 10/1995 | Wilson | 81/57.14 |

*Primary Examiner*—Robert C. Watson
*Attorney, Agent, or Firm*—Charles W. Chandler

[57] ABSTRACT

A crimping tool for progressively squeezing weatherstripping on an elongated thin molding such as around the border of a vehicle door.

2 Claims, 3 Drawing Sheets

OFFSET GEARED NUTRUNNER ATTACHMENT FOR SEALING WEATHERSTRIPPING ON AN ELONGATED THIN MOLDING

BACKGROUND OF THE INVENTION

This invention is related to a crimping tool for progressively squeezing a weatherstripping on an elongated thin molding by rotating a pair of rollers along the molding.

Weatherstripping used in automotive vehicles, such as around the door and trunk, typically is mounted on a molding to form a water-tight seal between the door and the passenger compartment. A certain type of weatherstripping has been developed that includes a generally V-shaped rubber like material with a metal core that must be crimped on the door molding. It is impractical to crimp the weatherstripping on the molding manually in a production setting.

SUMMARY OF THE INVENTION

The broad purpose of the present invention is to provide a power-operated tool for progressively and continuously crimping weatherstripping along the full length of a thin elongated molding. In the preferred embodiment of the invention, the tool comprises a housing which supports a pair of meshed gears. Each gear is attached to a roller extending from one side of the housing. The two rollers are spaced a distance sufficient to receive both the molding and the weatherstripping between them. The gears are meshed so that the two rollers rotate in opposite directions. One of the gears has a square hole for receiving the square stud of a power-operated tool which could be either pneumatic or direct current electric. The power tool is conventional and can be easily connected or disconnected from the crimping tool.

In operation, the two rollers are rotated so as to advance them along the molding and the weatherstripping as they progressively squeeze the weatherstripping on the molding. The crimping tool can be easily connected to a conventional hand-held power tool. It is relatively low in cost and provides sufficient torque to crimp the weatherstripping.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENTS

Figure 1:
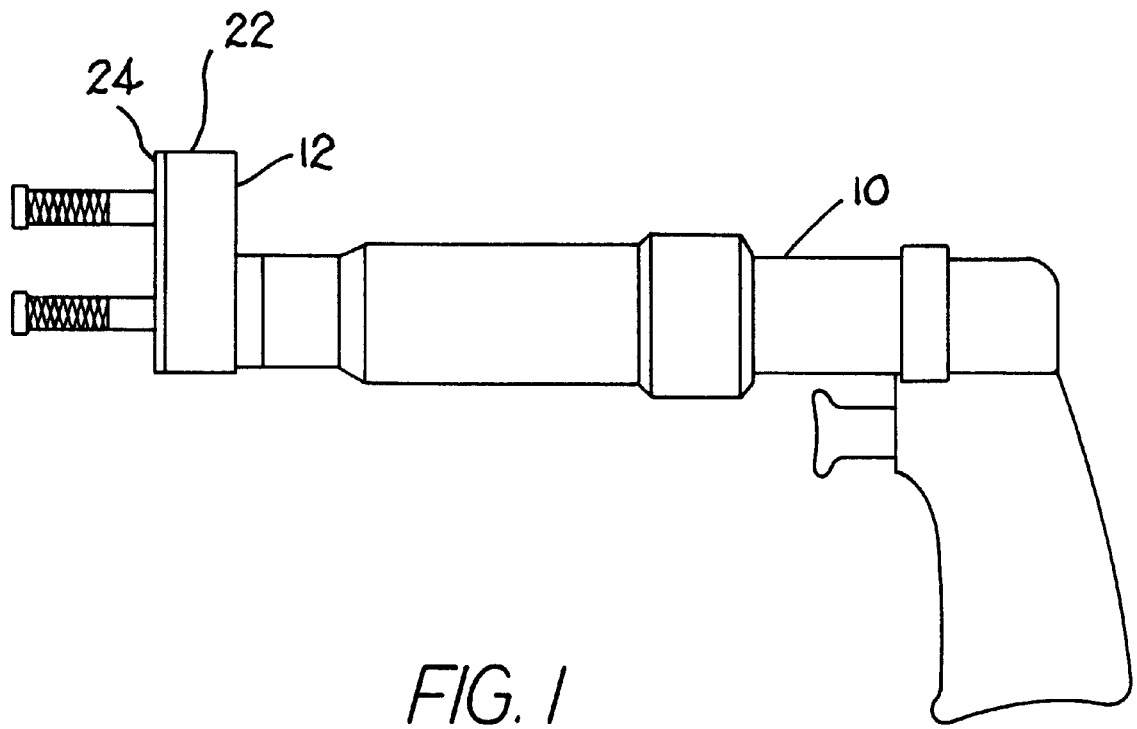
FIG. 1 is a elevational view of a power tool and a crimping tool illustrating the preferred embodiment of the invention.
Figure 2:
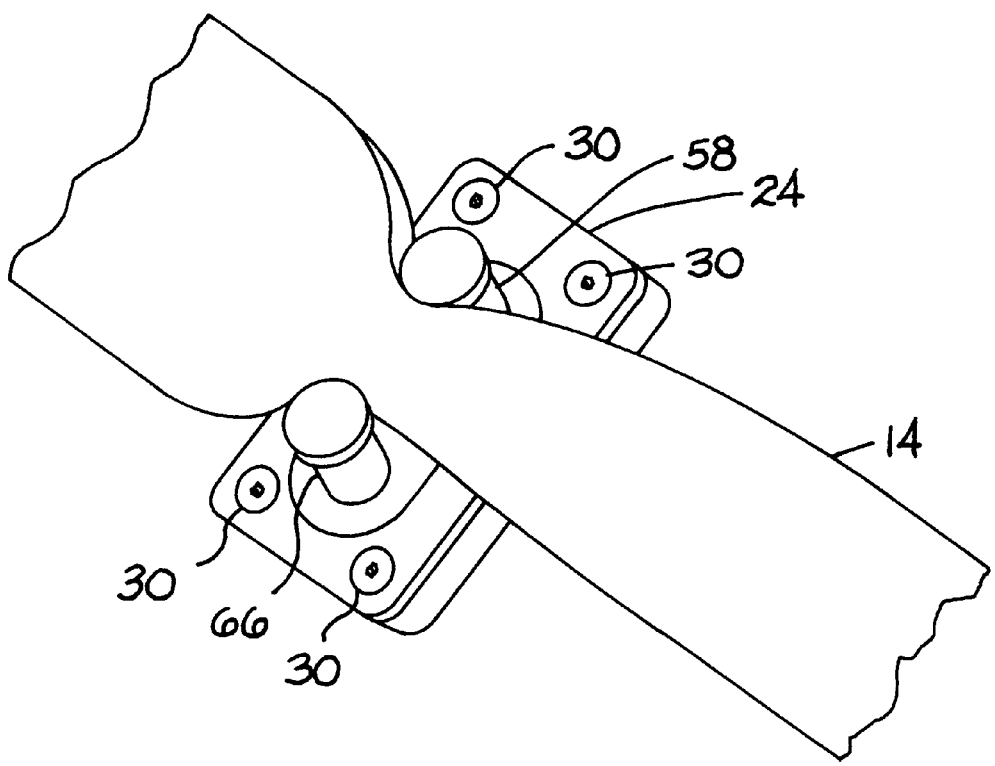
FIG. 2 is a view showing the manner in which the crimping tool squeezes the weatherstripping onto the molding.
Figure 3:
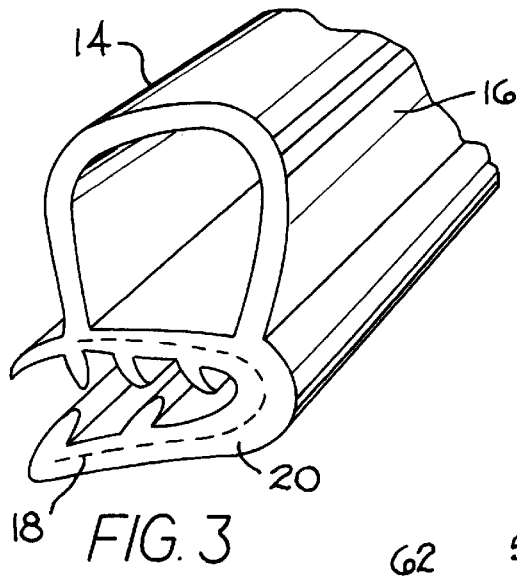
FIG. 3 is an enlarged sectional view of a section of the molding before it is crimped on the molding.

Referring to the drawings, FIG. 1 illustrates a conventional, hand-held pneumatic, trigger operated power tool 10 connected to a crimping tool 12 illustrating the preferred embodiment of the invention. Crimping tool 12 is employed to squeeze or crimp an elongated section of a compressible weatherstripping 14, illustrated in FIG. 3 in its uncompressed condition. Weatherstripping 14 has a resilient rubber-like hollow outer section 16 attached to a lower section 18 having a generally V-shaped cross-section. Lower section 18 has an internal steel wire core 20 which permit the two walls of section 18 to be crimped toward one another.

Figure 5:
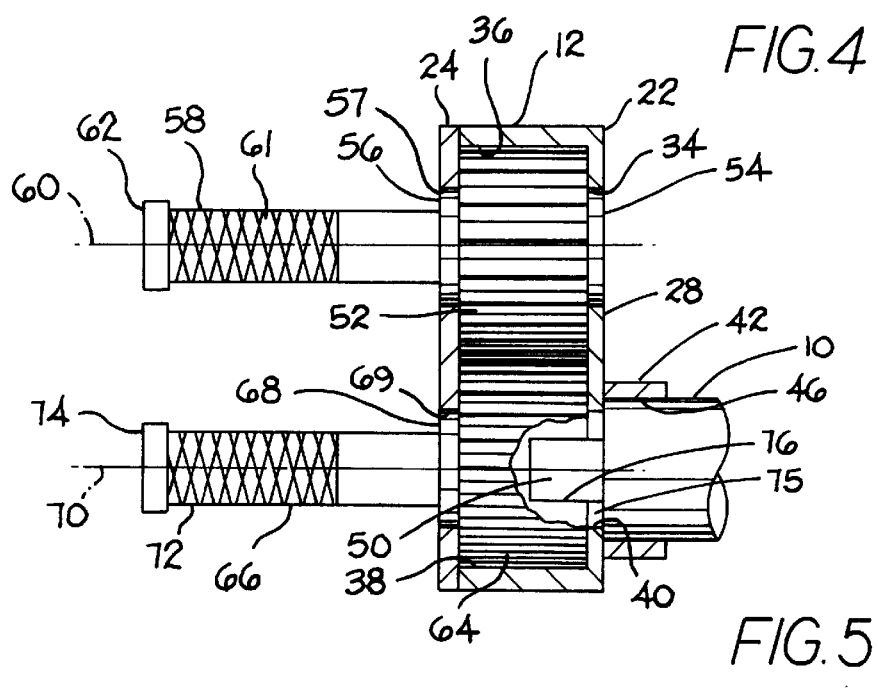
FIG. 5 is a sectional view of the crimping tool.
Figure 6:
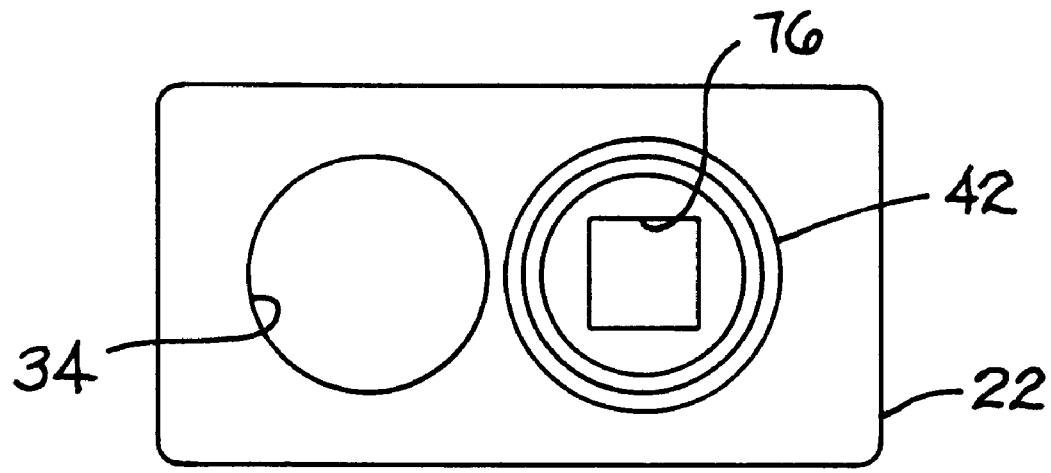
FIG. 6 is a top view of the crimping tool separated from the power tool.
Figure 7:
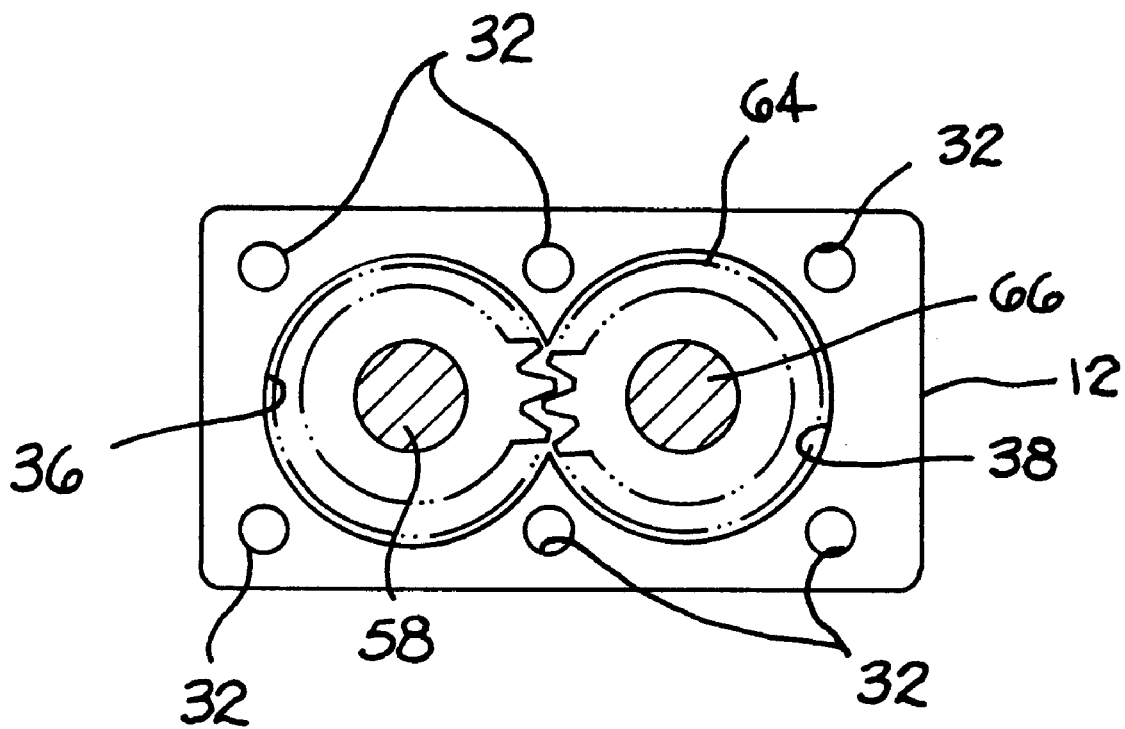
FIG. 7 is a view of the crimping tool housing with the cap removed.

Referring to FIGS. 5–7, crimping tool 12 comprises a rectangular shaped housing 22 with a housing lid 24. The housing has a bottom wall 28 as illustrated in FIG. 5. The housing lid is parallel to bottom wall 28 and is attached to the housing by a plurality of fastener means 30 which are threadably received within tapped hole means 32 shown in FIG. 7.

The housing has a cylindrical bottom bearing opening 34. Referring to FIG. 7, the housing interior has a pair of cylindrical gear chambers 36 and 38. Chamber 36 has a larger diameter than bottom opening 34 to form an annular gear seat. Cylindrical chamber 38 opens into a smaller opening 40 in the bottom wall.

Referring to FIG. 5, a cylindrical collar 42 is attached to the bottom of the housing around opening 40. Collar 42 has an internal opening 46 for receiving square drive spindle 50 of power tool 10.

Driven spur gear 52 is slideably seated in gear chamber 36 and has a narrow integral cylindrical section 54 slideably received in bearing opening 34. The gear has an annular shoulder 56 slideably journalled in bearing opening 57 in the housing lid. A roller member 58 is integrally attached to gear 52 so as to be rotatable about the axis of rotation 60 of the gear. The cylindrical side surface of the roller is knurled at 61. The outer end of the roller is internally threaded for receiving a nylon threaded fastener 62. Radially enlarged head of fastener 62 prevents scratching or marring the paint finish, should the tool contact the vehicle finish. For illustrative purposes, the gear has 20 teeth that extend the full height of chamber 36. The number of gear teeth is chosen to accommodate the weatherstripping thickness. Eleven sizes are available.

A driving spur gear 64 slideably rotatably mounted in gear chamber 38, also has an equal number of teeth disposed in an annular array and meshed with the teeth of gear 52. The two gears rotate together as driving gear 64 is being rotated.

A second roller 66 is attached to an annular shoulder 68 on the driving gear and extends along the axis of rotation 70 of the driving gear. Shoulder 68 is journalled in opening 69 of the housing lid. Roller 66 also has an outer knurled surface 72, and is internally threaded at its end to support a nylon fastener 74 having a non-scratching radially enlarged head. The two rollers have the same length and are parallel to one another, however, they rotate in opposite directions when the driving gear is being rotated.

Referring to FIG. 5, the driving gear has an annular shoulder 75 slideably journalled in opening 40. Shoulder 75 has a thickness corresponding to the thickness of the bottom wall of the housing.

The driving gear also has a female drive square spindle-receiving socket opening 76 which is formed about the rotational axis 70 of the driving gear. Spindle-receiving opening 76 is contained within the tooth profile of the driving gear and is adapted to drivingly releasably receive the square driving spindle 50 of the power tool.

Thus, it can be seen when the power tool 10 is seated on collar 42, the driving spindle 50 is received within the female square spindle-receiving opening 76 for rotating the driving gear. This in turn rotates the driven gear in such a manner that the two rollers rotate in opposite directions.

Figure 4:
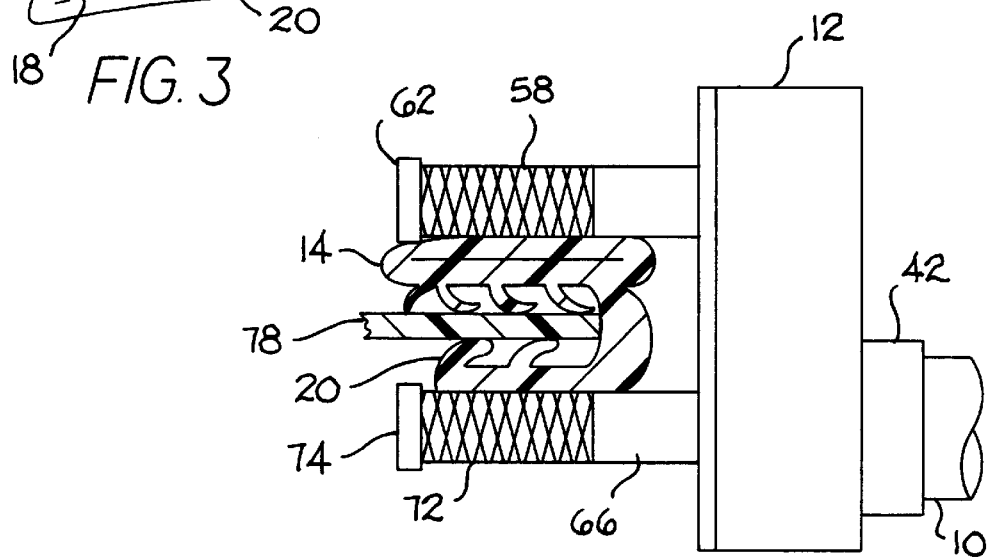
FIG. 4 is a sectional view showing the manner in which the weatherstripping is squeezed onto the molding.

The distance between the two rollers is such that when the rollers commence turning they can receive the weatherstripping between them to a crimped condition in which the two walls of the lower section 18 of the weatherstripping tightly embrace an elongated thin molding 78 as illustrated in FIG. 4. As the rollers are rotated, the knurled sections cause the rollers to progressively advance along the weatherstripping and the molding simultaneously compressing the steel reinforced section of the weatherstripping around the molding to form a tight connection. The outer hollow section 16 of the weather stripping then expands as the rollers advance along the molding leaving the crimped section in its compressed condition.

Having described my invention, I claim:

1. A crimping apparatus for progressively compressing weather-stripping on an elongated molding comprising:

a hand-held pistol-grip trigger-operated power tool (10) having a power output end, and a rotary drive spindle projecting from said output end;

a crimping tool comprising a housing (22) having a collar (42) telescopically connectable to the output end of said power tool, a drive gear within said housing having a socket (76) matable with said drive spindle, and a driven gear within said housing in mesh with said drive gear;

said crimping tool further comprising a first roller extending axially from said drive gear, and a second roller extending axially from said driven gear; said rollers being spaced apart for squeezing a weather-stripping against a molding while the crimping apparatus is advanced along the weather-stripping;

each said roller having a cylindrical side surface extending from said housing for gripping the weather-stripping, and a radially enlarged end (62, 74) spaced from said housing; said radially enlarged ends having annular side surfaces spaced closer together than the spacing between the cylindrical side surfaces of said rollers.

2. The crimping apparatus of claim 1, wherein the cylindrical side surface of each roller is knurled.

\* \* \* \* \*